（12） United States Patent
Hashimoto

(10) Patent No.: US 7,181,922 B2
(45) Date of Patent: Feb. 27, 2007

(54) AUTOMOTIVE AIR CONDITIONER

(75) Inventor: Hideki Hashimoto, Toyohashi (JP)

(73) Assignee: DENSO Corporation, Kariya (JP)

( * ) Notice: Subject to any disclaimer, the term of this patent is extended or adjusted under 35 U.S.C. 154(b) by 388 days.

(21) Appl. No.: 10/765,765

(22) Filed: Jan. 26, 2004

(65) Prior Publication Data
US 2004/0154324 A1 Aug. 12, 2004

(30) Foreign Application Priority Data
Jan. 29, 2003 (JP) .............................. 2003-020261

(51) Int. Cl.
F25D 25/00 (2006.01)
(52) U.S. Cl. ............................. 62/227; 62/227; 62/228; 62/151
(58) Field of Classification Search .................. 62/227, 62/228, 229, 151, 139, 156, 228.1; 236/78 D
See application file for complete search history.

(56) References Cited

U.S. PATENT DOCUMENTS 5,018,362 A * 5/1991 Nagase et al. ................ 62/133
5,533,353 A * 7/1996 Baker et al. .................. 62/227
5,884,497 A * 3/1999 Kishita et al. ................ 62/193
5,983,652 A * 11/1999 Iritani et al. .................. 62/156
6,016,966 A * 1/2000 Inoue ........................... 236/37
6,109,045 A * 8/2000 Takenaka ..................... 62/175
6,192,698 B1 * 2/2001 Kakehashi et al. ........... 62/227
6,330,909 B1 * 12/2001 Takahashi et al. .......... 165/202

FOREIGN PATENT DOCUMENTS

JP          2769073          4/1998

* cited by examiner

Primary Examiner—Cheryl Tyler
Assistant Examiner—Gene Bankhead
(74) Attorney, Agent, or Firm—Harness, Dickey & Pierce, PLC

(57) ABSTRACT

A cooled air temperature detector detects the temperature of air that has just passed through a refrigerant evaporator. The detector detects air temperatures for a plurality of locations on the cooling unit. When determining a control condition (ON/OFF condition) of the refrigerant compressor based on the post-evaporator temperature, an air conditioner ECU calculates and compares respective air temperatures detected by the detector and processes the lowest air temperature as the post-evaporator temperature. In another embodiment, a sensor detects a surface temperature at a plurality of locations on the refrigerant evaporator. The operation of the refrigerant compressor is controlled based on the lowest surface temperature detected.

5 Claims, 4 Drawing Sheets

AUTOMOTIVE AIR CONDITIONER

BACKGROUND OF THE INVENTION

1. Field of the Invention

The present invention relates to an automotive air conditioner in which the operation of a refrigerant compressor is controlled based on the temperature of a refrigerant evaporator or on the temperature of air immediately after the air has been cooled by the refrigerant evaporator.

2. Description of the Related Art

In a conventional automotive air conditioner, in order to prevent the reversal of liquid occurring in conjunction with the frosting of a refrigerant evaporator (in order to prevent the compression of liquid in a refrigerant compressor), a thermistor thermometer is disposed at an air downstream side of the refrigerant evaporator, so that the operation of the refrigerant compressor is ON/OFF controlled based on an air temperature (a lowest temperature of the refrigerant evaporator) that has been detected by the thermistor thermometer so disposed (refer to Japanese Patent No. 2769073).

As a single thermistor thermometer is used in the related art, the thermistor thermometer needs to be disposed so as to correspond to a lowest temperature location of the refrigerant evaporator in order to detect the frosting of the refrigerant evaporator in an early stage. However, as the lowest temperature location of a refrigerant evaporator differs depending on the type of refrigerant evaporators used (depends on the model), it has been necessary to determine the location of a temperature thermistor by carrying out many conformance tests for each model.

In addition, even if the mounting position of a thermistor thermometer is determined by conformance tests, it is not possible to prove that the mounting position so determined corresponds to the lowest temperature of the thermistor thermometer. Due to this, in an automotive air conditioner in which temperature and humidity conditions are wide and, moreover, the discharge flow rate of a refrigerant compressor varies at all times, it has been necessary to set a large safety factor in the control thereof, resulting in a risk of insufficient cooling performance.

SUMMARY OF THE INVENTION

The present invention was made to solve on this situation, and an object thereof is to provide an automotive air conditioner which can detect the lowest temperature of a refrigerant evaporator with good accuracy to allow a decrease in the control safety factor.

According to a first aspect of the invention, there is provided an automotive air conditioner comprising a refrigerant evaporator for cooling air blown into a driver-passenger compartment, a refrigerant compressor for drawing thereinto, compressing and discharging gaseous refrigerant which has evaporated as a result of heat exchange with air in the refrigerant evaporator, and a radiation thermometer for detecting a surface temperature of the refrigerant evaporator from an amount of radiation energy radiated from the refrigerant evaporator, wherein the operation of the refrigerant compressor is controlled based on a lowest temperature of the refrigerant evaporator that is detected by the radiation thermometer.

According to the construction, the lowest temperature of the refrigerant evaporator can be detected by metering the amount of radiation energy (infrared rays) radiated from the refrigerant evaporator by the radiation thermometer. In this case, as the position of the radiation thermometer does not need to be determined through conformance tests for each model, the number of processes for conformance can be decreased remarkably.

In addition, as the lowest temperature of the refrigerant evaporator can be detected with good accuracy, by controlling the operation of the refrigerant compressor based on the lowest temperature so detected, the safety factor can be set smaller to thereby improve the cooling performance. Furthermore, as the frosting of the refrigerant evaporator can be detected at an early stage and with good accuracy, the failure rate of the refrigerant compressor in conjunction with the icing of the refrigerant evaporator can be decreased.

According to another aspect of the invention, there is provided an automotive air conditioner comprising a refrigerant evaporator for cooling air blown into a driver-passenger compartment, a refrigerant compressor for drawing thereinto, compressing and discharging gaseous refrigerant which has evaporated as a result of heat exchange with air in the refrigerant evaporator, and an artificial eye sensor for detecting a surface temperature of the refrigerant evaporator using an artificial retina chip, wherein the operation of the refrigerant compressor is controlled based on a lowest temperature of the refrigerant evaporator that is detected by the artificial eye sensor.

According to the construction, the lowest temperature of the refrigerant evaporator can be detected from the surface temperature of the refrigerant evaporator. In this case, as the position of the artificial eye sensor does not need to be determined by implementing conformance tests for each model, the number of processes for conformance can be decreased remarkably.

In addition, as the lowest temperature of the refrigerant evaporator can be detected with good accuracy, by controlling the operation of the refrigerant compressor based on the lowest temperature so detected, the safety factor in control can be set smaller to thereby improve the cooling performance. Furthermore, as the frosting of the refrigerant evaporator can be detected at an early stage and with good accuracy, the failure rate of the refrigerant compressor in conjunction with the frosting of the refrigerant evaporator can be decreased.

According to a further aspect of the invention, there is provided an automotive air conditioner comprising a refrigerant evaporator for cooling air blown into a driver-passenger compartment, a refrigerant compressor for drawing thereinto, compressing and discharging gaseous refrigerant which has evaporated as a result of heat exchange with air in the refrigerant evaporator, and a cooled air temperature detecting means for detecting an air temperature immediately after air has been cooled by the refrigerant evaporator, whereby the operation of the refrigerant compressor is controlled based an air temperature detected by the cooled air temperature detecting means, wherein the cooled air temperature detecting means has a plurality of temperature detectors for detecting air temperatures for respective areas which result in the event that the refrigerant evaporator is divided into a plurality of areas.

According to the construction, as air temperatures are detected for the respective areas resulting in the event that the refrigerant evaporator is divided into the plurality of areas, by calculating and comparing the air temperatures of the plurality of locations so detected, an air temperature corresponding to the lowest temperature of the refrigerant evaporator can be detected. In this case, as the air temperature corresponding to the lowest temperature of the refrigerant evaporator can be detected with better accuracy as the number of areas divided increases, the mounting positions of the respective temperature detectors (for example, temperature thermistors) do not need to be determined by implementing conformance tests for each model, thereby making it possible to remarkably decrease the number of processes for conformance.

In the automotive air conditioner constructed as described above, a lowest temperature is preferably calculated from respective air temperatures detected by the plurality of temperature detectors.

According to the construction, by controlling the operation of the refrigerant compressor based on the lowest temperature so calculated, the safety factor can be set smaller, thereby making it possible to improve the cooling performance. Furthermore, as the frosting of the refrigerant evaporator can be detected at an early stage and with good accuracy, the failure rate of the refrigerant compressor in conjunction with the frost of the refrigerant evaporator can be decreased. In the automotive air conditioner according to the invention, the refrigerant compressor may be of a variable displacement type.

In the event that a compressor of variable displacement type is used, as the variation in refrigerant flow rate is larger than that of a compressor of ON/OFF type, a larger safety factor needs to be taken. On the contrary, according to the invention, as the operation of the refrigerant compressor can be controlled based on the lowest temperature of the refrigerant evaporator, even if the compressor of variable displacement type is used, the safety factor can be set smaller.

The present invention may be more fully understood from the description of preferred embodiments of the invention, as set forth below, together with the accompanying drawings.

DESCRIPTION OF THE PREFERRED EMBODIMENTS

Next, embodiments of the invention will be described based on the accompanying drawings.

(First Embodiment)

Figure 1:
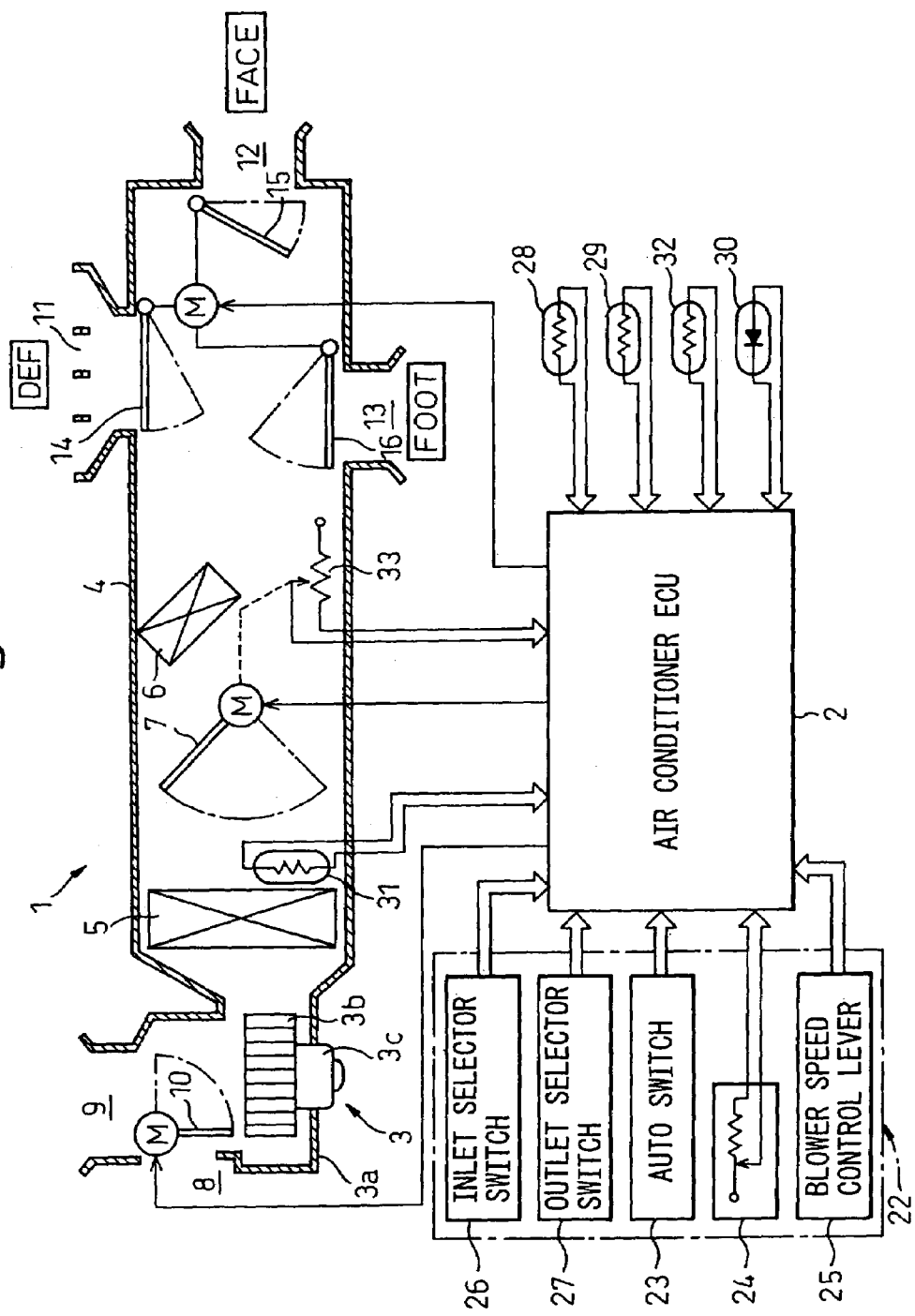
FIG. 1 is a system diagram showing the construction of an automotive air conditioner according to the invention as an example.

FIG. 1 is a system diagram depicting the construction of an automotive air conditioner as an example.

An air conditioner according to the invention includes an air conditioning unit 1 for supplying conditioned air into a driver-passenger compartment of a vehicle and an air conditioner ECU 2 for automatically controlling an air conditioning function.

The air conditioning unit 1 includes, in turn, a blower 3, a duct 4 which constitutes an air distribution passageway, a cooling unit 5 and a heating unit 6 which are both disposed within the duct 4, and an air mixing door 7 for implementing a temperature adjustment of air that is blown out.

The blower 3 includes a blower case 3a having air inlets (an inside air inlet 8 and an outside air inlet 9), a fan 3b accommodated in the blower case 3a and a motor 3c for driving the fan 3b. An inside air/outside air selector door 10 is provided on the blower case 3a which can selectively open and close the inside air inlet 8 and the outside air inlet 9 according to inlet modes.

Outlets (DEFROST outlet 11, FACE outlet 12, FOOT outlet 13) are formed at a downstream end of the duct 4 through which distributed air is forced out according to the outlet modes, and are opened and closed by outlet selector doors 14, 15, 16.

The cooling unit 5 is a refrigerant evaporator of a refrigeration cycle, and air passing through the cooling unit 5 is cooled when a low-temperature refrigerant flowing through the interior of the cooling unit 5 picks up latent heat from ambient air and vaporizes.

Figure 2:
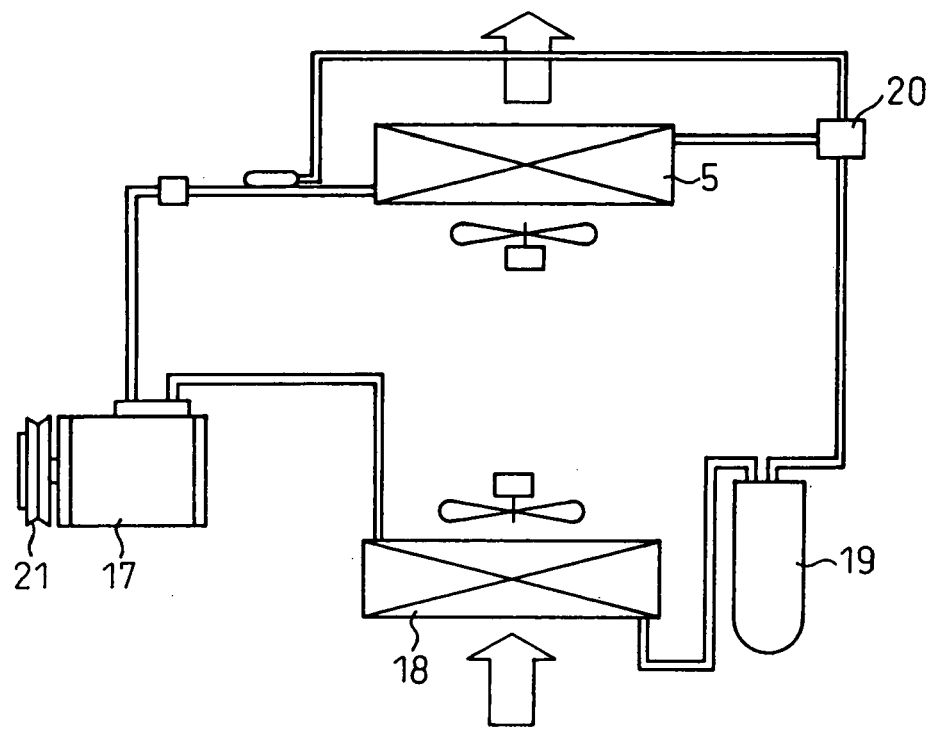
FIG. 2 is a diagram depicting a refrigeration cycle.

The refrigeration cycle is an extremely well-known system that is used for an automotive air conditioner and, as is shown in FIG. 2, is constituted by a refrigerant compressor 17, a refrigerant condenser 18, a receiver 19, an expansion valve 20 and the cooling unit 5 (the refrigerant evaporator). Note that the refrigerant compressor 17 is rotationally driven by an automotive engine (not shown) via an electromagnetic clutch 21.

The heating unit 6 is disposed on an air downstream side of the cooling unit 5, and when passing through the heating unit 6, air cooled by the cooling unit 5 is heated as a result of heat exchange with hot water (for example, an engine coolant) flowing through the interior of the heating unit 6. Note that a bypass passageway is provided in the interior of the duct 4 so that air cooled by the cooling unit 5 can bypass the heating unit 6.

The air mixing door 7 is provided in such a manner as to swing between a MAX-COOL position (a position indicated by solid lines in FIG. 1) where an air inlet of the heating unit 6 is totally closed and a MAX-HOT position (a position indicated by chain lines in FIG. 1) where the bypass passageway is totally closed and functions to adjust a ratio between the amount of air passing through the heating unit 6 and the amount of air bypassing the heating unit 6.

The air conditioner ECU 2 is an electronic control unit which incorporates therein a micro-computer and functions to read in operation signals of various switches that are controlled on an air conditioner control panel 22 and sensor information (sensor signals) detected by various sensors (which will be described later on) and to control air conditioning based on these signals so read in (such as control of the temperature of outlet air, control of inlet mode, control of outlet mode, control of the speed of the blower 3, and ON/OFF control of the refrigerant compressor 17).

Provided on the air conditioner control panel 22 are an AUTO switch 23 for commanding the air conditioner ECU 22 to execute air conditioning, a temperature set lever 24 for setting the air conditioning temperature inside the driver-passenger compartment, a blower speed set switch 25 for setting speed levels of the blower 3 in a stepped (or continuous) fashion, an inlet selector switch 26 for selecting an inlet mode, and an outlet selector switch 27 for selecting an outlet mode.

Provided as sensors are an inside air temperature sensor 28 for detecting the temperature in the driver-passenger compartment (an inside air temperature Tr), an outside air temperature sensor 29 for detecting the temperature outside the driver-passenger compartment (an outside air temperature Tam), a sunlight sensor 30 for detecting the amount of sunlight Ts, a cooled air temperature detecting means 31 for detecting the temperature of air that has just passed through the cooling unit 5 (a post-evaporator temperature Te), a cooling water temperature sensor 32 for detecting the temperature of engine cooling water (a coolant temperature Tw), and a potentiometer 33 for detecting the opening of the air mixing door 7.

Figure 3:
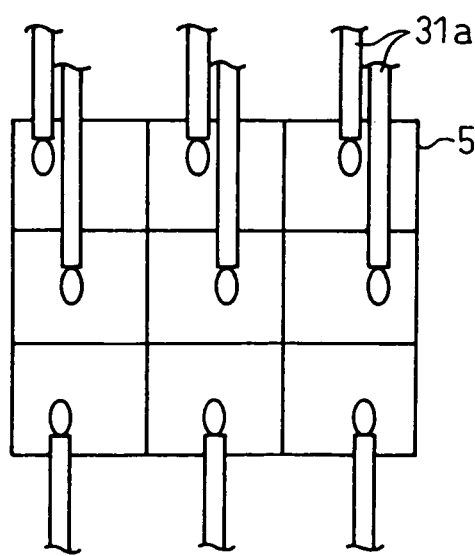
FIG. 3 is a schematic diagram depicting a method for sensing a post-evaporator temperature.

As shown in FIG. 3, however, the cooled air temperature detecting means 31 is constituted by a plurality of thermistor thermometers 31a for detecting air temperatures (temperatures of air immediately after the air has been cooled by the cooling unit 5) for respective areas in the event that the cooling unit 5 is divided into a plurality of areas.

Figure 4:
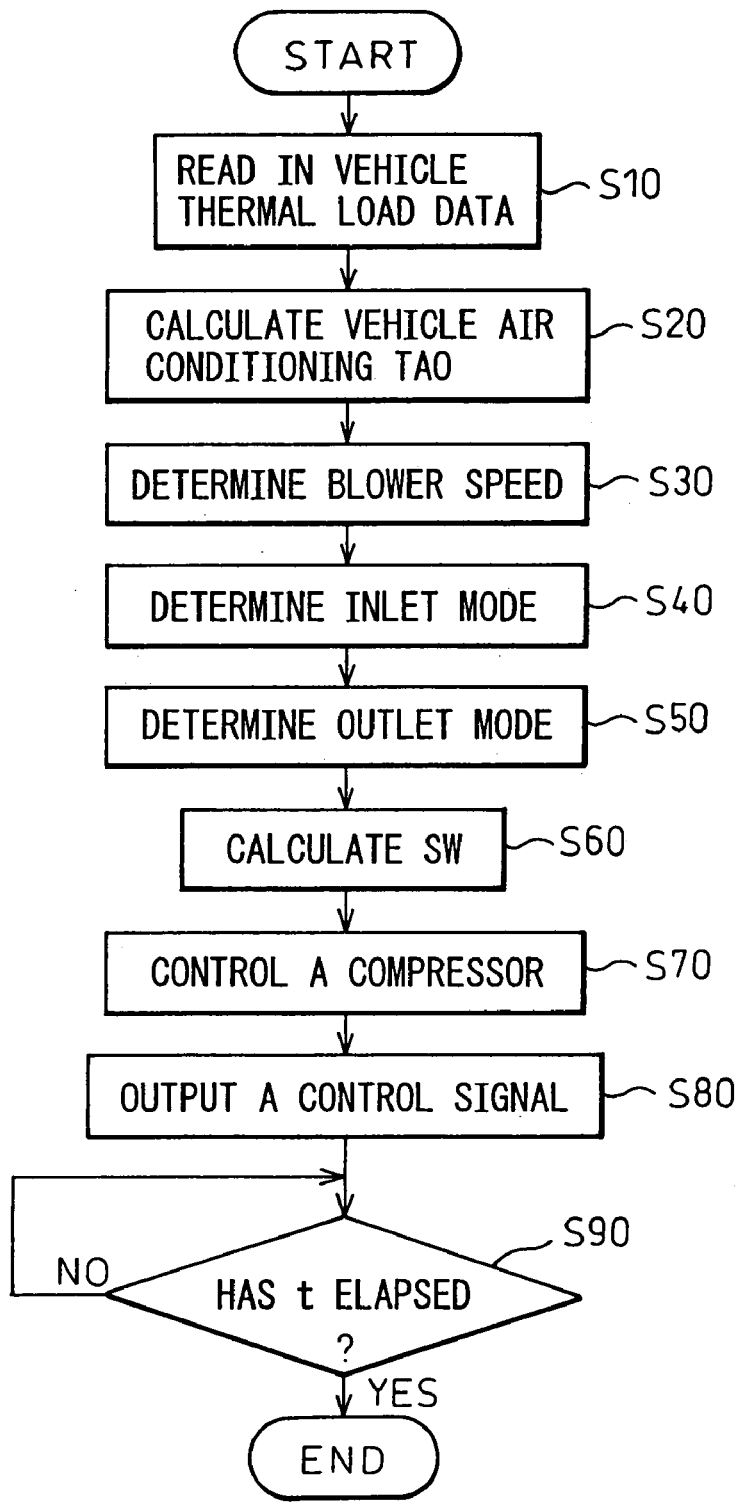
FIG. 4 is a flowchart depicting a control procedure of an air conditioner ECU.

Next, a control procedure of the air conditioner ECU 2 when executing the air conditioning, and when the AUTO switch 23 is turned on, will be described based on a flowchart shown in FIG. 4.

Step 10: read in a set temperature Tset that is set by the temperature set lever 24 and sensor information (inside air temperature Tr, outside air temperature Tam, sunlight amount Ts, post-evaporator air temperature Te, cooling water temperature Tw) detected by the respective sensors.

Step 20: calculate a target outlet temperature TAO of air blown into the driver-passenger compartment from the following equation;

$$TAO = Kset \cdot Tset - Kr \cdot Tr - Kam \cdot Tam - Ks \cdot Ts + C$$

Where, Kset: temperature set gain, Kr: inside air temperature gain, Kam: outside air temperature gain, Ks: sunlight gain, C: correction gain.

Step 30: determine a speed of the blower 3 based on TAO so obtained.

Step 40: determine an inlet mode based on TAO so obtained.

Step 50: determine an outlet mode based on TAO so obtained.

Step 60: calculate a target opening SW for the air mixing door 7 from the following equation;

$$SW = \{(TAO-Te)/(Tw-Te)\} \times 100(\%)$$

Figure 5:
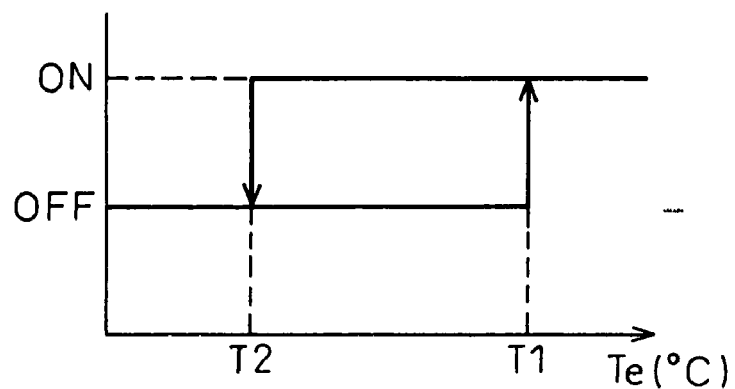
FIG. 5 is a control map for a refrigerant compressor.

Step 70: as shown in FIG. 5, determine the control condition (ON/OFF condition) of the refrigerant compressor 17 based on the post evaporation temperature Te. Note that the air conditioner ECU 2 calculates and compares respective air temperatures detected by the plurality of thermistor thermometers 31a so as to process a lowest air temperature as the post evaporation temperature Te.

Step 80: output control signals to respective control devices (servo motors and driving circuits) so that control target values obtained in the steps 30 to 70 can be attained.

Step 90: wait until a predetermined period of time t has elapsed. After the predetermined period of time has elapsed, resume the steps 10 and onward repeatedly.

In this embodiment, as air temperatures are detected for the respective areas resulting when the cooling unit 5 is divided into the plurality of areas, an air temperature corresponding to the lowest temperature of the cooling unit 5 can be detected by calculating and comparing the air temperatures detected from the plurality of locations. In this case, needless to say, the air temperature corresponding to the lowest temperature of the cooling unit 5 can be detected with better accuracy as the number of areas so divided increases.

According to the construction of the embodiment, as the individual temperature thermistors 31a which constitute the cooled air temperature detecting means 31 need only to be disposed for the respective areas, no conformance test need to be carried out to determine the mounting position of the temperature thermistor 31a, thereby making it possible to remarkably decrease the number of processes for conformance testing.

In addition, as the lowest temperature of air which has passed through the cooling unit 5 can be detected with good accuracy, the safety factor in control can be set small, and the cooling performance can be improved by such an extent. Furthermore, as the frosting of the cooling unit 5 can be detected at an early stage and with good accuracy to thereby decrease the reversal of liquid in conjunction with the frosting of the cooling unit 5, the failure rate of the refrigerant compressor 17 is decreased.

(Second Embodiment)

This embodiment is an embodiment where a radiation thermometer 34 for detecting a surface temperature (a lowest temperature) of the cooling unit 5 is used instead of the cooled air temperature detecting means 31 described with respect to the first embodiment, whereby the operation of the refrigerant compressor 17 is controlled based on a temperature detected by the radiation thermometer 34.

Figure 6:
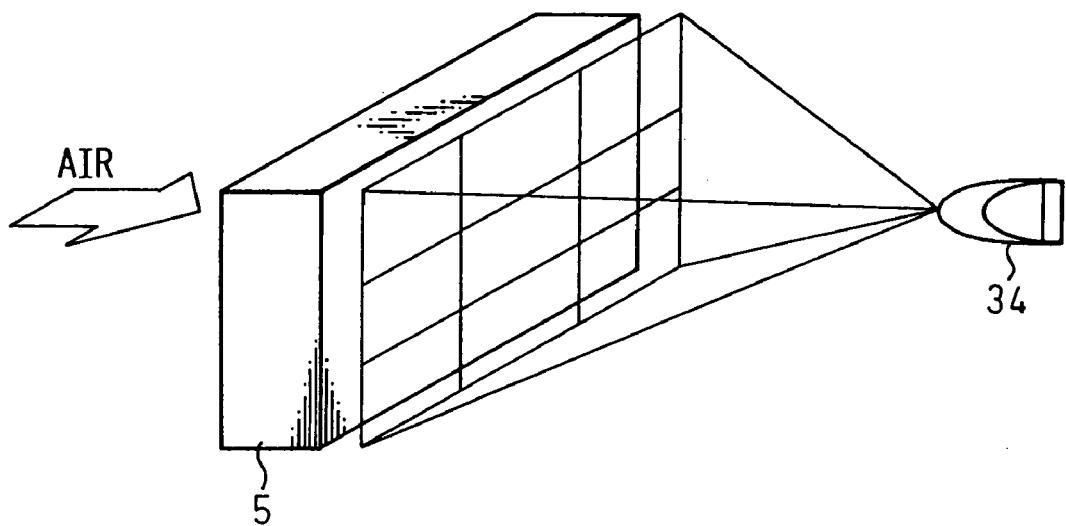
FIG. 6 is a perspective view depicting an example in which a radiation thermometer is used.

The radiation thermometer 34 is, for example, as shown in FIG. 6, disposed on the air downstream side of the cooling unit 5 to detect a surface temperature (in particular, a lowest temperature) of the cooling unit 5 by metering the amount of infrared rays radiated from the cooling unit 5.

According to the construction, as infrared rays radiated from the cooling unit 5 only have to be metered by the radiation thermometer 34, the mounting position of the radiation thermometer 34 can be set relatively freely. Namely, as the temperature of air that has just passed through the cooling unit 5 does not have to be detected, the mounting position of the radiation thermometer 34 does not have to be determined by implementing conformance tests for each model, thereby making it possible to remarkably decrease the number of processes for conformance testing.

In addition, as the lowest temperature of the cooling unit 5 can be detected with good accuracy by the radiation thermometer 34, the safety factor in control can be set small, thereby making it possible to improve the cooling performance by such an extent. Furthermore, since the frosting of the cooling unit 5 can be detected in its earlier stage and with good accuracy and the risk of occurrence of a reversal of liquid in conjunction with the icing of the cooling unit 5 can be decreased, the failure rate of the refrigerant compressor 17 is decreased.

Note that as the radiation thermometer 34 detects not air temperatures but the surface temperature of the cooling unit 5, the radiation thermometer 34 does not always have to be disposed on the air downstream side of the cooling unit 5 but may be disposed on an air upstream side of the cooling unit 5.

(Third Embodiment)

Instead of the radiation thermometer 34 described with respect to the second embodiment, an artificial eye sensor (not shown) having an artificial retina chip may be used. In this case, a similar advantage to that obtained by the second embodiment can be obtained by detecting a surface temperature (a lowest temperature) of the cooling unit 5 by the artificial retina chip and controlling the refrigerant compressor 17 based on the lowest temperature so detected.

In the first embodiment, while the refrigerant compressor 17 is ON/OFF controlled via the electromagnetic clutch 21, the constructions of the invention may be applied to controlling the operation of a variable displacement type compressor. As the variation in refrigerant flow rate of the variable displacement type compressor is larger than that of the ON/OFF type refrigerant compressor 17, a larger safety factor must be used. On the contrary, according to the invention, as the lowest temperature of the cooling unit 5 can be detected with good accuracy, the safety factor can be made smaller even with a variable displacement type compressor.

While the invention has been described by reference to the specific embodiments chosen for purposes of illustration, it should be apparent that numerous modifications could be made thereto by those skilled in the art without departing from the basic concept and scope of the invention.

The invention claimed is:

1. An automotive air conditioner comprising;
   a refrigerant evaporator for cooling air blown into a driver-passenger compartment,
   a refrigerant compressor for drawing thereinto, compressing and discharging gaseous refrigerant which has evaporated as a result of heat exchange with air in the refrigerant evaporator, and
   a radiation thermometer for detecting a surface temperature at a plurality of locations on the refrigerant evaporator from an amount of radiation energy radiated from the refrigerant evaporator, wherein
   the operation of the refrigerant compressor is controlled based on a lowest surface temperature of the surface temperatures at the plurality of locations on the refrigerant evaporator that are detected by the radiation thermometer.

2. An automotive air conditioner as set forth in claim 1, wherein the refrigerant compressor is of a variable displacement type.

3. An automotive air conditioner comprising;
   a refrigerant evaporator for cooling air blown into a driver-passenger compartment,
   a refrigerant compressor for drawing thereinto, compressing and discharging gaseous refrigerant which has evaporated as a result of heat exchange with air in the refrigerant evaporator, and
   cooled air temperature detecting means for detecting an air temperature immediately after air has been cooled by the refrigerant evaporator, whereby
   the operation of the refrigerant compressor is controlled based on an air temperature detected by the cooled air temperature detecting means, wherein
   the cooled air temperature detecting means has a plurality of temperature detectors, each temperature detector detecting an air temperature after air has been cooled by the refrigerant evaporator, each temperature detector being disposed at one of a plurality of locations immediately downstream from the refrigerant evaporator in an air flow direction.

4. An automotive air conditioner as set forth in claim 3, wherein a lowest temperature is calculated from the air temperatures detected by the plurality of temperature detectors, and wherein the operation of the refrigerant compressor is controlled based on the lowest temperature.

5. An automotive air conditioner as set forth in claim 3, wherein the refrigerant compressor is of a variable displacement type.

* * * * *